Patented Oct. 12, 1954

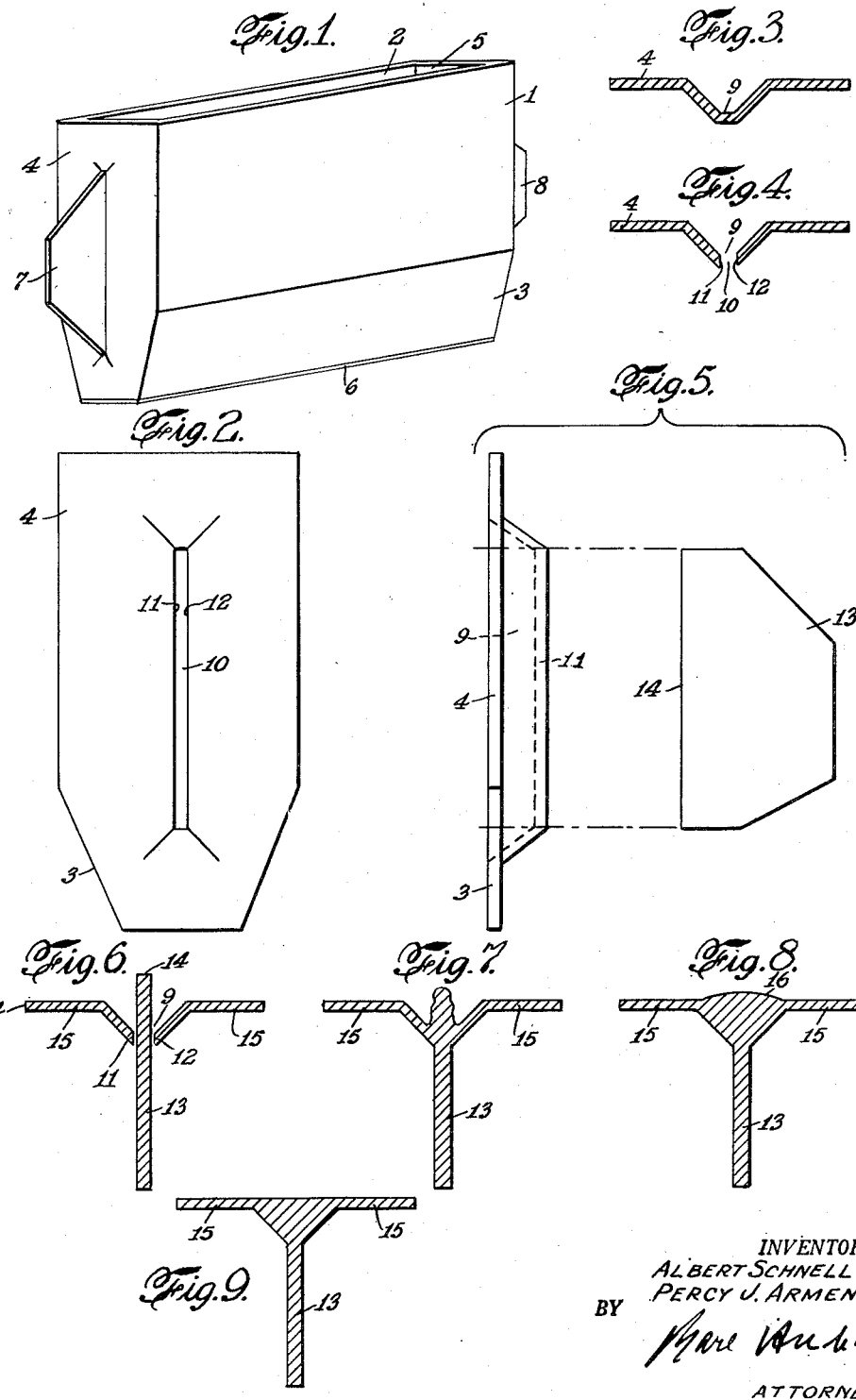

2,691,214

UNITED STATES PATENT OFFICE 2,691,214

METHOD OF MAKING CRUCIBLES FOR HEATING THERMOPLASTIC MATERIALS

Albert Schnell, Linden, and Percy J. Armeny, Roselle Park, N. J., assignors to Baker & Co., Inc., Newark, N. J., a corporation of New Jersey Application August 8, 1951, Serial No. 240,964

1 Claim. (Cl. 29—482)

The present invention deals with a crucible for heating thermoplastic materials and more particularly with an electrically heated crucible for melting thermoplastic materials.

Crucibles which are adapted to contain thermoplastic materials and in which the said materials, such as glass, are melted are preferably manufactured from high heat resisting metals such as platinum, platinum alloys or even certain nickel or molybdenum containing base metal alloys.

Although several known methods may be employed to heat the crucibles and melt the material contained therein, electrical heating of the crucible is a preferred method.

In manufacturing a suitable crucible adapted to be electrically heated, especially a crucible used for melting glass, side plates, a bottom plate, end plates, and electrical terminal leads on the end plates are welded or brazed to form the finished crucible.

However, in welding or brazing the component parts, and especially in welding or brazing the terminal leads to the end plates, it is difficult to perform the welding or brazing operation so that the passage of electrical current from the terminal leads to the crucible proper, e. g. the end plates, results in a uniform heating of the crucible. The usual practice is to provide fillet welds for joining a terminal lead and an end plate externally of the crucible. In such case, not only is the fillet weld a non-uniform mass about the base of the terminal which contacts a face of the end plate, but the penetration of the welding metal between the terminal lead and the end plate creates void areas or spots which results in "hot spots" or other variations detrimental to the passage of current from the terminal lead to the end plate. Variations in the passage of electrical current to the crucible produces undesirable heating in that required temperatures at certain critical areas of the crucible are not uniformly attained. For example, a condition may exist where the electrical resistance of one portion of the welded terminal lead is greater than that of another portion thereby not only impeding the passage of electrical current but also making it difficult to maintain a uniform current distribution. In the case of non-uniform current distribution, it is possible that one portion of the crucible will attain a high melting temperature before another portion so that the molten thermoplastic material contained by the crucible will not be uniformly heated.

It is an object of the present invention to provide a method for making an improved electrically heated crucible for melting thermoplastic materials. It is another object of the present invention to provide a method for making an electrically heated crucible adapted to be uniformly heated by the particular construction of the crucible and the electrical terminal leads forming a part thereof. It is a further object of the present invention to provide a method for making a crucible for melting thermoplastic materials and constructed of high heat resistant metals or alloys. It is a still further object of the present invention to provide a method for making an electrically heated crucible formed of welded or brazed plate members of high heat resistant metals or alloys. Other objects and advantages of the present invention will become apparent from the description hereinafter following and the drawings forming part hereof, in which:

Fig. 1 is a perspective view of an electrically heated crucible according to the present invention, Fig. 2 is a top view of an end plate of the crucible, Fig. 3 is a cross-sectional view of an end plate at an early state in manufacture, Fig. 4 is a cross-sectional view of an end plate at a later stage in manufacture, Fig. 5 is a side view of an end plate and a terminal lead prior to assembly, Fig. 6 is a cross-sectional view of a terminal lead and end plate in assembling position, Fig. 7 is a cross-sectional view of an early stage in an end plate terminal lead combining operation, Fig. 8 is a cross-sectional view of a later combining stage, and Figure 9 is a cross-sectional view of a finished end plate-terminal lead combination.

The present invention relates to a method for making crucibles including bushings or feeders, made of heat resisting metals, in which thermoplastic materials, e. g. glass, are melted by electrical heating. More particularly the invention concerns the construction of such crucibles and especially the construction of that portion of the crucible to which electrical current is supplied and which includes a novel construction of a terminal lead and end plate combination operative to supply a uniform distribution of heat not only to the end plate but to other portions of the crucible as well. The term "uniform heating" herein referred to is not limited in the strict sense of the term wherein the entire crucible is heated to an even temperature since, as known in the art, certain portions of the crucible may have different thicknesses to provide an electrical resistance consonant with the temperature required at a selected portion of the crucible. In the broad sense, "uniform heating" herein refers to a uniform distribution of heat to similar sides or end portions of the crucible. For example, the lower half of the crucible may be provided with a temperature sufficiently high to insure a desirable fluidity of the molten material as, for example, in the case of feeders containing molten glass, while the upper half of the crucible may be less resistant to the passage of electrical current.

According to Figure 1, the crucible of this invention comprises side plates 1 and 2 which, preferably, have inwardly disposed bottom portions such as at 3, end plates 4 and 5 which are joined to the ends of the side plates and conform with the configuration of such ends, a bottom plate 6, and terminal leads 7 and 8 integral with end plates 4 and 5 as hereinafter more particularly described.

Figures 2 and 3 illustrate a top view and a cross-sectional view respectively of an end plate, e. g. end plate 4, having impressed therein a longitudinal recess or groove 9, as particularly shown by Figure 3, and which is provided with a longitudinal aperture 10 slit or sheared or otherwise formed lengthwise of the groove 9 and in accordance with Figures 2 and 4. The aperture 10 is preferably slit in a manner such as to provide a pair of oppositely positioned parallel faces or walls 11 and 12 through the thickness of the plate and preferably perpendicular to the recessed face of the end plate and the said recess having a depth in excess of the thickness of the plate.

Figure 5 illustrates a side view of the end plate 4 and of the terminal lead 13 positioned prior to assembly or joining. The terminal lead 12 is a plate member at least partly insertable into and having at least a portion thereof dimensioned to substantially fill the aperture 10, as shown by Figure 6, whereby the said parallel walls 11 and 12 abut or are substantially flush with the sides of the terminal lead. The insertable portion of the terminal lead is engaged with the end plate so that the longitudinal edge 14 passes through the aperture and beyond the groove 9 or the plane of the grooved face 15 of the end plate 4.

Having so engaged or positioned the terminal lead with the end plate, both being made of the same material, e. g. platinum, the edge 14 is subjected to welding temperature whereby edge 14 is melted and the molten metal flows downwardly and under application of heat into the lowest portion of the groove 9 thereby filling any voids which may exist between the walls or faces 11 and 12 and the terminal lead, as shown by Figure 7, and integrally combining the terminal lead with end plate 4 to form a homogeneous structure. When the edge 14 is positioned beyond the groove 9 or plane 14, it is positioned beyond the said groove or plane to such an extent as to provide a sufficient mass of molten metal to substantially fill the groove. Preferably, an excess of metal is utilized in filling the groove 9 in order to provide a raised area 16, according to Figure 8, above the plane 15. This raised area is subsequently machined or otherwise finished to provide a substantially smooth surface, as shown by Figure 9, whereby, when the end plate is joined to the sides 1 and 2 of Figure 1 there will result a smooth internal crucible surface.

The integral and homogeneous end plate terminal lead combination as described not only provides a means for uniformly distributing a heating current but also provides an end plate member for electrically heated crucibles which has greater strength and provides a longer life for crucibles and the like than heretofore has been possible. Moreover, the depression 9 may be provided with any desirable width and, consequently, the raised face may be provided with any desirable slope of metal between the terminal lead and the flat surface of the said raised face so that electrical current may be thereby distributed nearer the edges of the end plate if desired.

Moreover, the end plate-terminal lead structure, because of the particular form of the slit as hereinbefore set forth, has smooth clear-cut bond contours, as opposed to the known fillet type joints on the outer surface of end plates which, due to the difficulty of providing an even distribution of metal around the jointed area, render the distribution of current non-uniform.

Although the invention has been described relative to particular specific structures, it is apparent that terminal leads of various shapes may be inserted into correspondingly shaped apertures without departing from the scope of the invention.

What we claim is:

The method of making an electrically heated crucible comprising forming a pair of metal end plates, a pair of metal side plates and a metal bottom plate providing each end plate member with a terminal lead for electrically heating the said crucible by forming a recess in said plate member, forming an aperture through the recessed portion of said plate member, forming a terminal lead of electrically conductive metal having at least a portion thereof dimensioned and shaped to engage the walls of said aperture, inserting the said portion into said aperture, positioning the terminal lead so that the said portion extends beyond the said aperture and beyond the recessed face of the plate member, applying heat to and melting the said extended portion whereby the molten metal is deposited in said recess, said extended portion being extended beyond the said face to an extent such as to provide an excess mass of metal when melted, said excess metal filling the said recess beyond the plane of said recessed face, finishing the said excess mass of metal to the plane of said face, thereby forming an integral homogeneous structure and joining said plates to form said crucible.

References Cited in the file of this patent

UNITED STATES PATENTS

| Number | Name | Date |
| --- | --- | --- |
| 1,554,385 | Still | Sept. 22, 1925 |
| 1,562,419 | Bowen | Nov. 17, 1925 |
| 2,264,897 | Becker et al. | Dec. 2, 1941 |
| 2,345,918 | Dahlstrand | Apr. 4, 1944 |

FOREIGN PATENTS

| Number | Country | Date |
| --- | --- | --- |
| 3,854 | Great Britain | Feb. 28, 1891 |